(12) United States Patent  (10) Patent No.: US 8,217,949 B1
Carpenter et al.  (45) Date of Patent: Jul. 10, 2012

(54) HYBRID ANALYTIC AND SAMPLE-BASED RENDERING OF MOTION BLUR IN COMPUTER GRAPHICS

(75) Inventors: Loren Carpenter, Nicasio, CA (US); Robert L. Cook, San Anselmo, CA (US)

(73) Assignee: Pixar, Emeryville, CA (US)

( * ) Notice: Subject to any disclaimer, the term of this patent is extended or adjusted under 35 U.S.C. 154(b) by 618 days.

(21) Appl. No.: 12/417,431

(22) Filed: Apr. 2, 2009

(51) Int. Cl.
*G06T 13/00* (2011.01)
(52) U.S. Cl. ........................ 345/474; 345/419
(58) Field of Classification Search ............... 345/474, 345/419
See application file for complete search history.

(56) References Cited

U.S. PATENT DOCUMENTS 5,261,041 A * 11/1993 Susman ................ 345/473
5,809,219 A * 9/1998 Pearce et al. ............... 345/426

* cited by examiner

*Primary Examiner* — Maurice L McDowell, Jr.
(74) *Attorney, Agent, or Firm* — Kilpatrick Townsend & Stockton LLP; Philip H. Albert

(57) ABSTRACT

A contribution of a geometric element's attribute to a value of the image sample is determined analytically for an analytic dimension of evaluation and using sampling for a discrete dimension of evaluation. Motion blur effects are rendered by analytically determining the proportions of shutter time during which image samples are exposed to objects. Space-time projections are determined by the geometry edges' positions at the beginning and the end of the shutter time, which define surfaces of space-time projections. The times that the sample ray of an image sample enter and leave the space-time projections specify the proportions of the image sample's shutter time during which scene geometry is exposed to image sample points. The attribute value of an image sample point is determined from values of all of the scene geometry visible to the image sample point during the shutter time, each weighted by the time that it is visible.

22 Claims, 10 Drawing Sheets

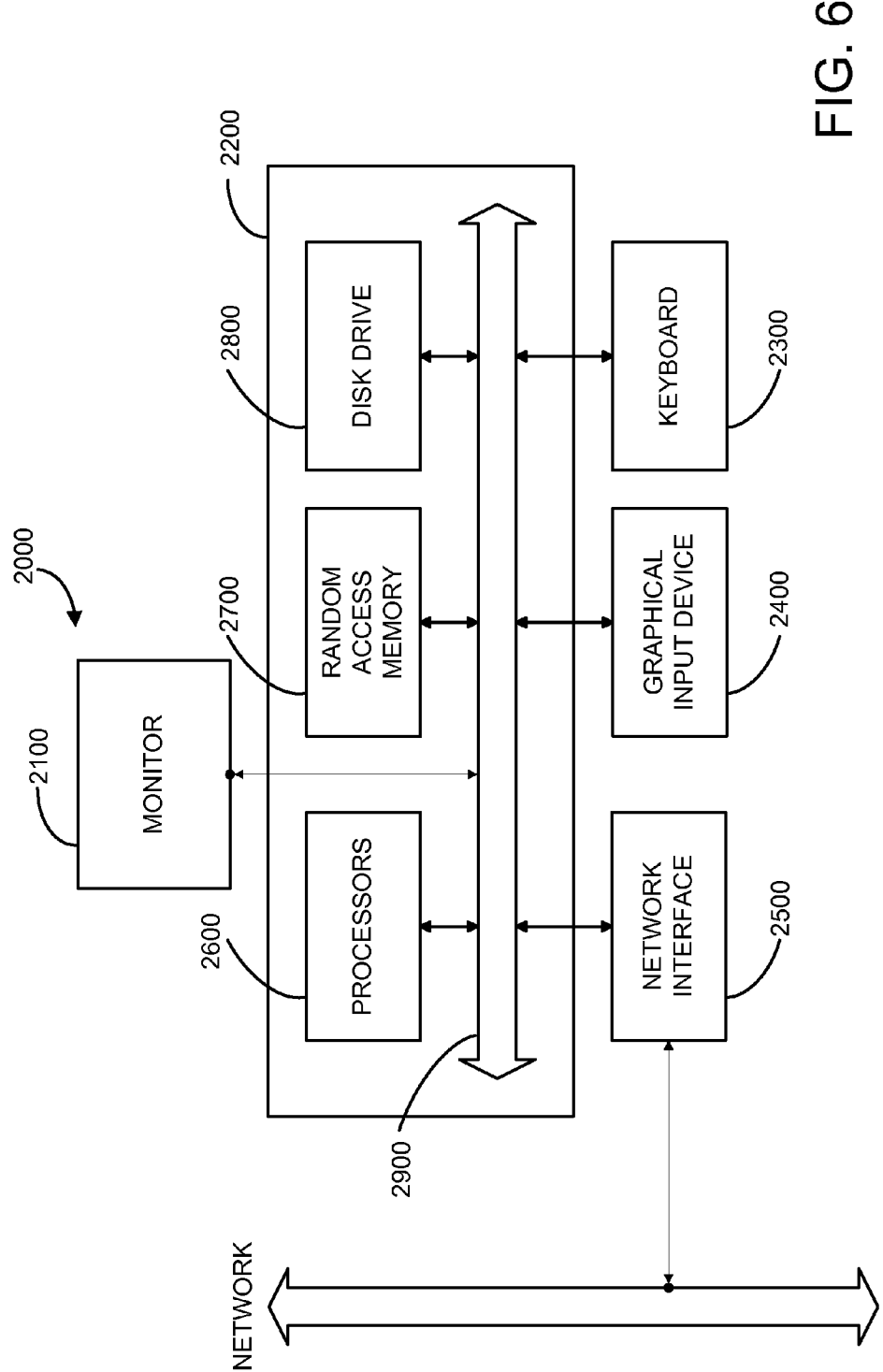

HYBRID ANALYTIC AND SAMPLE-BASED RENDERING OF MOTION BLUR IN COMPUTER GRAPHICS

BACKGROUND

The present invention relates to the field of computer graphics, and in particular to methods and apparatus for creating motion blur effects.

Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene. Animated sequences can be created by rendering a sequence of images of a scene as the scene is gradually changed over time. A great deal of effort has been devoted to making realistic and/or aesthetically pleasing rendered images and animations.

Previously, computer graphics rendering used either analytic or sampling-based techniques to determine the attribute values of pixels of an image from three-dimensional scene data. Analytic techniques attempt to determine the exact contribution of scene data to the attribute value of a pixel. For example, analytic anti-aliasing techniques attempt to determine the exact coverage of a pixel by a polygon or other geometric element. One type of analytic anti-aliasing technique determines the convolution integral of a pixel filter kernel and a polygon or geometric element partially or entirely covering the pixel.

Analytic rendering techniques provide high quality results without aliasing or other artifacts. However, analytic rendering techniques are often very time-consuming and mathematically difficult to process.

Additionally, many rendering effects, such as motion blur, depth of field, soft shadowing, complex illumination, refraction, and reflection are impractical to perform using analytic techniques for typical computer graphics scenes.

As a result of the difficulties with analytic rendering techniques, sampling-based rendering techniques are predominantly used to render images. Sampling-based techniques determine attribute values from the three-dimensional scene data at discrete points in space and/or time. These attribute values are then combined to determine the attribute values of pixels of the image.

One example of sample-based anti-aliasing divides each pixel into a plurality of sub-pixels. The attribute values of the sub-pixels are determined by sampling the three-dimensional scene data and then combined to determine the attribute value of the pixel.

In another example, motion blur is a phenomenon resulting in the apparent streaking or blurring of rapidly moving objects. Motion blur occurs in still and motion picture photography as objects move relative to the camera during the period of exposure determined by the camera's shutter. Motion blur may occur because objects move, because the camera moves, or because of combinations of both object and camera movement.

An example of sample-based motion blur effects assign a different time value within a shutter time period to each pixel or sub-pixel. Renderers and other computer graphics applications previously simulated motion blur effects by specifying a "shutter time" for a virtual camera. For each frame of animation, the renderer evaluates the motion path or other animation data of an object at different discrete times within the shutter time interval to determine several different positions or poses of the object over the shutter time interval. The renderer then renders at least portions of the object at the different discrete times within the shutter time interval to create a motion blurred image. Thus, different pixels or sub-pixels "see" the scene at different times, producing a motion blur effect.

An example of sample-based depth of field effects assign different lens aperture positions to each pixel or sub-pixel, so that the pixels or sub-pixels "see" the scene at different point of view, producing a depth of field or focus effect.

Example sample-based illumination effects select multiple different discrete points within a light source for each illuminated portion of a scene to determine the illumination from this light source. This produces soft-shadowing effects. Example sample-based reflection and refraction effects select multiple different discrete points within a scene for each reflective or refractive portion of a scene to produce reflection or refraction effects.

Each of the sample-based effects requires a large number of samples to operate effectively. When using multiple effects, the number of samples required to render a pixel increases substantially. Furthermore, sampling requires that the data source be bandlimited in frequency to prevent aliasing. Unlike a one-dimensional signal or a two-dimensional image, filtering four-dimensional scene data (three spatial dimensions and time) is impractical. Thus, aliasing effects often occur, which must be minimized by increasing the number of samples, which increases the computational resources required for rendering, or using stochastic sampling, which hides aliasing at the expense of increasing noise.

For example, temporal artifacts, such as aliasing and noise, are one problem with sample-based motion blur rendering techniques. Temporal aliasing and noise artifacts in motion blur occur because the motion of the object is always rendered or sampled at discrete moments of time. If the number of samples per frame is less than the spatial-temporal variation due to the object and its motion, then aliasing visual artifacts can occur. For example, if a small object moves at a speed of one pixel or sub-pixel image sample per frame, then object's motion will be synchronized with the motion blur sampling. This will cause a flickering or beating visual artifact as the object is consistently sampled at the same place on the object at the same time interval for each frame. Distributing samples randomly or pseudo-randomly in space and/or time reduces aliasing artifacts, but introduces noise artifacts. Noise artifacts may increase as the number of dimensions of evaluation increase.

Aliasing artifacts are a common problem when applying motion blur to rotating objects. When an object is rotating, often some point along its radius will be moving at the critical speed that causes aliasing. Aliasing artifacts are also a common problem when applying motion blur to fast moving objects. If an object travels at a rate of 100 pixels across an image per frame, the motion blur effect should appear as a 100 pixel long streak. However, because the renderer samples the motion of the object only a small number of times, for example four time samples per frame, the image of the object will appear as a sparse set of points, rather than a continuous streak.

A prior approach to reducing temporal artifacts is to increase the number of samples. For example, to decrease temporal aliasing in sample-based motion blur effects, the number of different sample times used by the renderer to evaluate the motion of an object within the shutter interval of each frame is increased. However, increasing the number of sample times greatly increases the time, memory, and computational resources required for rendering. Additionally, regardless of the number of sample times used, there may be still be some types of object motion that create temporal artifacts.

In summary, prior analytic rendering techniques provide accurate and high quality visual output, but tend to be very time-consuming and mathematically difficult to process, especially for complex scenes using many different rendering effects together, such as anti-aliasing, motion blur, depth of field, and illumination effects. Sampling-based techniques are mathematically tractable for rendering complex scenes with many different rendering effects, but are prone to artifacts such as aliasing and noise. Increasing the sampling rate reduces these artifacts; however, this increases the time and computational resources required rendering. Moreover, regardless of the sampling rate, there may still be artifacts such as aliasing.

SUMMARY

An embodiment of the invention renders images using a combination of analytic and discrete sampling-based techniques. In an embodiment of this hybrid approach, a first subset of the dimensions of evaluation of a scene are rendered using analytic techniques, while a second subset of the dimensions of evaluation of the scene are rendered using sample-based rendering techniques. Examples of dimensions of evaluation include positions in image space or an image plane (for anti-aliasing); lens and aperture positions (for depth of field effects); positions within light sources or angles from objects to light sources (for illumination effects); positions of occluding objects or angles from objects to occluding objects (for shadowing effects); reflection, refraction, scattering, ambient occlusion, and other lighting effects; and time (for motion blur effects).

In an embodiment, because analytic rendering techniques are typically limited to a small number of dimensions of evaluation, rendering remains mathematically tractable. However, the usage of these analytic rendering techniques over even a few dimensions of evaluation can greatly reduce the overall aliasing and noise for a given sampling rate, especially if the analytic rendering techniques are applied to dimensions of evaluation that include high frequency data, such as time.

An embodiment of this hybrid analytic and sample-based technique receives three-dimensional scene data and defines image samples within an image to be rendered. Each image sample includes at least one analytic dimension of evaluation and at least one discrete, or sample-based, dimension of evaluations.

An embodiment of the invention defines a sample ray for an image sample based on the camera viewpoint and determines an intersection of the sample ray with a geometric element defined by the three-dimensional scene data. This embodiment then determines a contribution of an attribute of the geometric element to a value of the image sample analytically for the analytic dimension of evaluation and discretely for the discrete dimension of evaluation.

For example, an embodiment of the invention determines motion blur effects by analytically determining the amount of time within the shutter time that an image sample point is exposed to objects. Because embodiments of the invention determine image sample point values from a continuous exposure to scene geometry during the shutter time, rather than sampling the scene at discrete times, temporal noise and aliasing and their associated visual artifacts are eliminated. In this example, other dimensions of evaluation, such as the coverage of the image sample by the geometric elements, lens or aperture positions, and/or reflection, refraction, illumination, shadowing, ambient occlusion, scattering, and/or rendering effects are determined by discretely sampling the scene.

An embodiment of the invention analytically evaluates motion blur effects by creating space-time projections of scene geometry. A space-time projection of a geometric element is a geometric representation of the three-dimensional space traversed by the geometric element relative to the camera viewpoint between the shutter opening time and the shutter closing time of an image to be rendered. For each image sample point used to create this image, an embodiment of the invention identifies any space-time projections that intersect the sample ray of the image sample point during the shutter time.

An embodiment of the invention then determines the times that the sample ray of an image sample intersects the boundaries of the space-time projections. These times specify the proportion of the image sample point's shutter time in which a given portion of scene geometry is visible to the image sample point. The color value of an image sample point is determined from color values of all of the portions of scene geometry visible to the image sample point during the shutter time period, with each portion of scene geometry's color value weighted by the length of time that it is visible.

In an embodiment, space-time projections of geometric elements are created by determining the positions of geometric element edges at the beginning and the end of the shutter time. For each edge, an embodiment defines a surface bounded by the edge at its beginning and ending positions. The intersections of these surfaces with the sample ray of an image sample point are identified to determine the time interval during which an image sample point is exposed to a given geometric element point. An embodiment weights the attribute values of a geometric element in proportion to its associated time interval to determine its contribution to the attribute values of the image sample point.

BRIEF DESCRIPTION OF THE DRAWINGS

The invention will be described with reference to the drawings, in which:

FIG. 6 illustrates a computer system suitable for implementing an embodiment of the invention.

DETAILED DESCRIPTION

Figure 1:
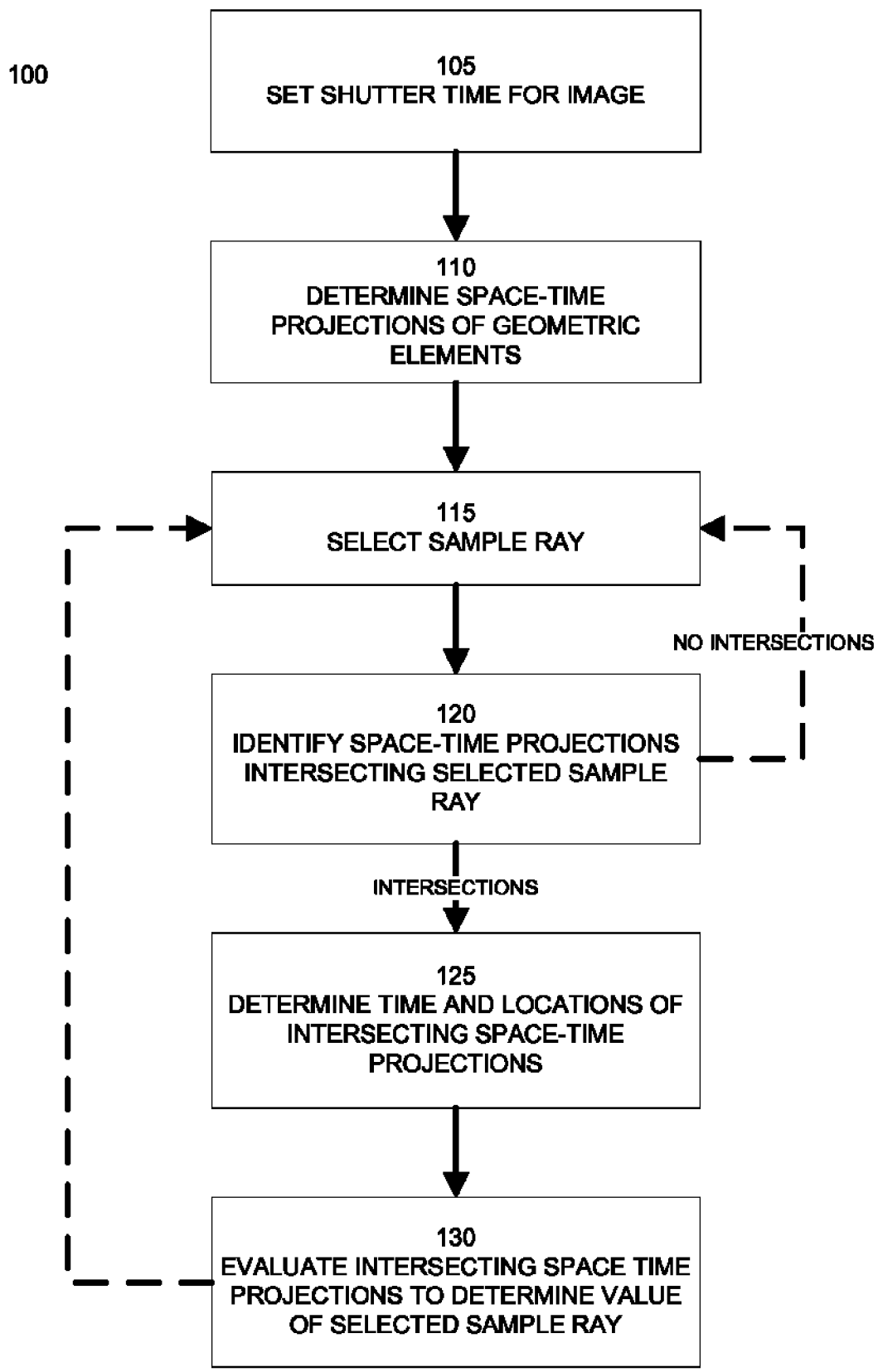
FIG. 1 illustrates a method of rendering motion blur effects according to an embodiment of the invention.

An embodiment of the invention renders images using a combination of analytic and discrete sampling-based techniques. An embodiment of this hybrid analytic and sample-based technique receives three-dimensional scene data and defines image samples within an image to be rendered. Each image sample includes at least one analytic dimension of evaluation and at least one discrete, or sample-based, dimension of evaluation. Dimensions of evaluation include positions in image space or an image plane; lens and aperture positions; positions within light sources or angles from objects to light sources; positions of occluding objects or angles from objects to occluding objects; reflection, refraction, scattering, and other lighting effects; and time.

For example, an embodiment of the invention may use sampling to determine pixel coverage of geometric elements to perform anti-aliasing. However, this embodiment may analytically determine the amount of time within the shutter time period that the pixel or other image sample is exposed to objects. In this example, the embodiment evaluates the dimension of time analytically and the dimension of position within an image or image plane discretely. Because this embodiment of the invention determines image sample values from a continuous exposure to scene geometry during the shutter time, rather than sampling the scene at discrete times, temporal aliasing and its associated visual artifacts are eliminated.

Example dimensions of evaluation include the coverage of the image sample by the geometric elements; lens or aperture positions; and/or reflection, refraction, illumination, shadowing, ambient occlusion, scattering, and other lighting and shading effects; and other rendering effects. Other embodiments of the invention may use any combination of discrete and analytic evaluation for these dimensions of evaluation.

Embodiments of the invention may use any sample-based or analytic rendering techniques known in the art to evaluate dimensions of evaluation. In a further embodiment, motion blur effects are analytically determined by creating space-time projections of scene geometry representing the volume of space traversed by the scene geometry during the shutter time of a frame. For each image sample point used to create an image, the renderer identifies space-time projections that intersect the sample ray of the image sample point during the shutter time. The renderer determines the times that space-time projections of scene geometry enter and leave the sample ray of an image sample. These times specify the proportion of the image sample point's shutter time in which a given portion of scene geometry is visible to the image sample point. The color or other attribute value of an image sample point is determined from color values of all of the portions of scene geometry visible to the image sample point during the shutter time period, with each portion of scene geometry's color value weighted at least in part by the length of time that it is visible. Because this embodiment determines image sample point values from a continuous exposure to scene geometry during the shutter time, rather than sampling the scene at discrete times, temporal aliasing and its associated visual artifacts are eliminated.

Renderers typically convert descriptions of three-dimensional geometry, animation, lighting, texturing, and shading into one or more two dimensional images. The three dimensional geometry can be described in terms of surfaces or volumes. Surfaces can include planar surfaces, such as planar polygons, and non-planar surfaces, such as curved surfaces, subdivision surfaces, implicit surfaces, and other types of freeform surfaces.

To render a scene, many renderers divide or tessellate surfaces or volumes into a mesh of sub-pixel size polygons, such as quadrilaterals or other shapes, typically referred to as "micropolygons." The micropolygons closely approximate the surface at the scale defined by the size of the micropolygons. Alternatively, a renderer may operate on the scene geometry directly without dividing it into micropolygons.

Portions of the scene geometry under evaluation by the renderer are referred to herein as geometric elements, which may include both portions of the surface itself, micropolygons, and other sub-pixel size approximate representations of the surface or a volume.

Additionally, to create an image with motion blur, at least a portion of the scene geometry and/or the camera viewpoint must be moving. In an embodiment, animation data defines the change in position, shape, and/or orientation of scene geometry over time. Animation data can be created by users and/or generated using procedures or simulations. Animation data may be expressed in terms of keyframes setting values of animation variables; paths and motion curves; and/or positions, velocities, and accelerations of scene geometry.

FIG. 1 illustrates a method 100 of rendering motion blur effects according to an embodiment of the invention. Step 105 sets a shutter time period for the image to be rendered. The length of the shutter time period determines the amount of motion blur introduced in an image, with longer shutter time periods typically producing more motion blur in images. Shutter time periods may be specified in seconds or fractions of a second, in fractions of the interval between adjacent frames of animation (if an animated sequence is being rendered), or in terms of degrees, which is traditionally used to express exposure times for conventional film cameras with mechanical disk shutters. In further embodiments, multiple shutter time periods may be defined for a single image or frame of animation.

Regardless of how the shutter time period is initially defined, step 105 determines a shutter opening time and a shutter closing time for the current image to be rendered. The shutter opening time indicates the time at which the renderer begins evaluating the motion of the scene geometry to create an image. The shutter closing time indicates the time at which the renderer ends its evaluation of the motion of the scene geometry.

Step 110 determines space-time projections of at least a portion of the geometric elements forming the scene geometry. A space-time projection is a geometric representation of the space traversed by a geometric element from the shutter opening time to the shutter closing time. In an embodiment, step 110 forms a geometric element by sweeping the geometric element along its motion path from its position at the shutter opening time (referred to as its shutter opening position) to its position at the shutter closing time (referred to as its shutter closing position). The motion path of a geometric element may be a linear path or a non-linear path. In a further embodiment, the motion path of a geometric element is approximated as a linear path between its positions at the shutter opening and shutter closing times, regardless of how the motion path of the geometric element is actually defined over the shutter time.

The space-time projection of a geometric element can be defined by creating surfaces between corresponding edges of the geometric element at its shutter opening and shutter closing positions. These surfaces and the geometric element at its shutter opening and shutter closing positions define a closed, three-dimensional object representing the space traversed by the geometric element from the shutter opening time to the shutter closing time. A space-time projection of a geometric element may be represented as an object extruded or swept in three-dimensional space along its motion path or as an object occupying four-dimensional space-time.

An embodiment of step 110 determines space-time projections for all of the geometric elements comprising the scene geometry. Another embodiment may use any bounding and culling technique known in the art to limit or reduce the number of geometric elements processed by step 110.

Figure 2:
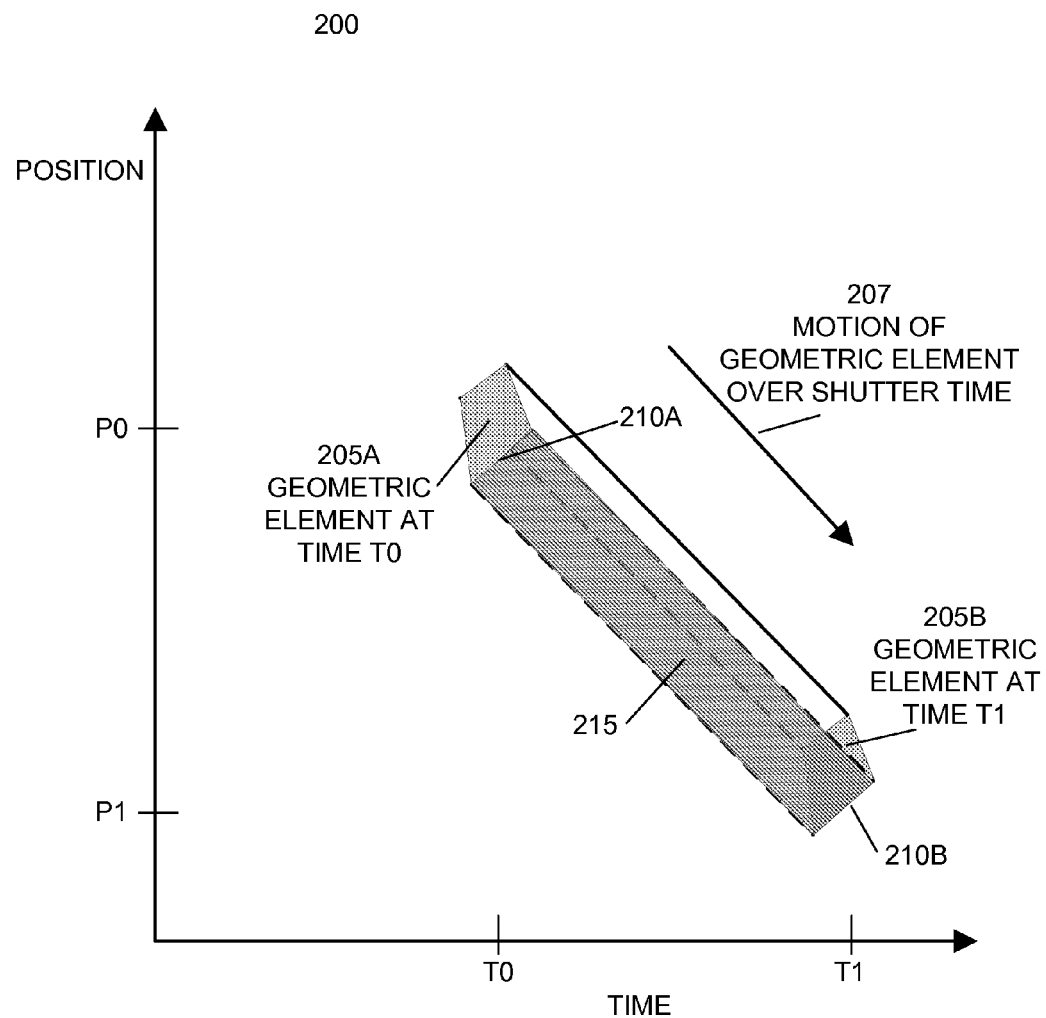
FIG. 2 illustrates an example space-time projection of a geometric element according to an embodiment of the invention.

FIG. 2 illustrates an example 200 of a space-time projection of a geometric element according to an embodiment of the invention. In FIG. 2, the vertical axis designates position and the horizontal axis designates time. Thus, a geometric element 205A has a position P0 at the shutter opening time T0. This sample geometric element moves along motion path 207 to position P1 at the shutter closing time T1, where the geometric element and is labeled 205B. The motion path 207 of the geometric element can arise from movement of the geometric element, movement of the camera viewpoint, or a combination of these movements. For clarity, the motion path 207 of the geometric element 205 in three-dimensional space is shown in FIG. 2 as movement along the vertical axis; however, embodiments of the invention are intended to be applied to geometric elements that move, change orientation, and/or change shape in three-dimensional space over time.

An embodiment of the invention creates a space-time projection from the motion of geometric element 205 by connecting corresponding edges of the geometric element at the shutter opening and shutter closing times to form surfaces. For example, at time T0 and position P0, geometric element 205A has edge 210A. This edge corresponds with edge 210B of the geometric element 210B at time T1 and position P1. By connecting edges 210A and 210B, a surface 215 can be formed. Surface 215 represents the path of the edge 210 from its position at time T0 to its position at time T1.

Additional surfaces can be similarly created for the other edges of the geometric element. The combination of the geometric element at its shutter opening and shutter closing positions and the surfaces defined by the paths of each of its edges form the space-time projection of the geometric element. For example, if geometric element 205 travels along a straight line from position P0 to P1 (or if its path is approximated as a line), then the space-time projection of example geometric element 205 has a closed, six-sided prism shape.

Returning to method 100, following the determination of space-time projections of one or more geometric elements in the scene in step 110, step 115 selects a sample ray for evaluation. In an embodiment, a renderer creates an image by defining a plurality of image sample points in an image plane. The renderer determines the color, transparency, and optionally other attributes of each image sample point based on its view into the scene geometry.

In an embodiment, the view of an image sample point is specified as a sample ray, typically originating at a pixel, sub-pixel, or image sample point and oriented at least in part by a specified camera viewpoint. A sample ray originating at a point on the image plane, aperture plane, or other imaging location is referred to as a primary sample ray. In some applications, image sample points are also assigned lens positions within a virtual camera aperture to simulate depth of field effects. In these applications, the primary sample ray associated with an image sample point may be determined using its assigned lens position as well.

Additionally, sample rays may originate at points within a scene. Sample rays originating at points within the scene are referred to as secondary sample rays. In an embodiment, secondary sample rays may be created in response to the intersection of primary sample rays or other secondary sample rays with scene elements to create effects such as reflection, refraction, illumination, and scattering. Embodiments of the invention may generate secondary sample rays recursively in response to the interaction of primary sample rays and other secondary sample rays with the scene and its scene elements.

To create an image, the renderer determines color, transparency, and optionally other attribute values for sample rays, such as primary and secondary sample rays. These sample ray attribute value are then combined to determine color, transparency, and optionally other attribute values of the associated image sample point. The value of each pixel in an image is determined from the attribute values of one or more image sample points.

It should be noted that sample rays are discussed herein for purposes of illustration and any rendering techniques and representations of the view of a scene known in the art may be used with embodiments of the invention. For example, sample rays may be used for ray-tracing, ray-casting, or other types of rendering in world and/or object space coordinate reference frames. In another example, sample rays may be used for ray-tracing, ray-casting, or other types of rendering in camera-space or image space coordinate reference frames. In another example, geometric elements may be projected on to an image plane and rendered using rasterization, z-buffering, scanline rendering, or other image space rendering techniques. In this example, the sample ray is represented by a projection transformation on to the image plane. In yet another example, all or a portion of the scene may be transformed into a camera space coordinate system and/or to a coordinate system centered and aligned with each primary or secondary sample ray.

Step 120 identifies space-time projections that intersect the selected sample ray. As discussed in detail below, embodiments of step 120 can include a number of different techniques to identify space-time projections of geometric elements that intersect the selected sample ray. In some embodiments, step 120 determines if a selected sample ray intersects either the volume or one or more of the surfaces of any of the space-time projections of geometric elements. In other embodiments, the volume or surfaces of the space-time projections of geometric elements are projected on to the image plane to perform the intersection test. In other embodiments, the surfaces of the space-time projection are decomposed or approximated as less complex polygons, such as triangles. Step 120 then determines if one or more of these polygons intersect the selected sample ray.

If there are no intersections between the selected sample ray and the space-time projections of the geometric elements, method 100 optionally proceeds back to step 115 to select another sample ray for evaluation. If there are no sample rays left to process, then method 100 is complete.

Conversely, if the selected sample ray intersects the space-time projection of at least one the geometric elements, then method 100 proceeds to step 125. Step 125 identifies the time period during which the space-time projection of a geometric element intersects the selected sample ray. In an embodiment, this time period is given by an intersection start time, corresponding to the time when the geometric element enters the selected sample ray, and an intersection end time, corresponding to the time when the geometric element leaves the selected sample ray. In some cases, the space-time projection of a geometric element initially intersects the selected sample ray prior to the shutter opening time. In this case, an embodiment of step 125 sets the intersection start time to the shutter opening time. Similarly, in some cases, the space-time projection of a geometric element is still intersecting the selected sample ray at the shutter closing time. In this case, an embodiment of step 125 sets the intersection end time to the shutter closing time.

Additionally, step 125 identifies one or more points on the space-time projection of a geometry where the intersection with the selected sample ray occurs. In an embodiment, the locations of the intersection is determined at the intersection start time and the intersection end time. In an embodiment, the intersection locations can be expressed as points in three-dimensional space. In another embodiment, the location of each intersection can be expressed in terms of the edge of the geometric element that intersects the sample ray, the position along this edge where the intersection occurs, and the depth or distance from the camera viewpoint at the point of intersection.

Step 130 evaluates the times and positions of the intersections of the space-time projections with the selected sample ray to determine the sample ray's attribute values, such as color and transparency. These sample ray attribute values are optionally combined with other sample rays' attribute values to determine the attribute value of an image sample point. In an embodiment, the intersection start and end times for a space-time projection of a geometric element specify the duration of exposure of the sample ray, and hence the associated image sample point, to this geometric element. For example, if the difference between the intersection start and end times of a space-time projection of a geometric element is 1/1000th of a second and the shutter time is 1/500th of a second, then this geometric element is visible to the selected sample ray for half of its shutter time. As a result, the color of this geometric element determines 50% of the final color value of the selected sample ray. In further embodiments, the weighting may be non-linear, such that geometric elements visible to the sample ray during some portions of the shutter time period are weighted higher than those visible for the same amount of time during other portions of the shutter time period.

Step 130 uses the positions of the intersection points of the space-time projections for two purposes. First, if the color, transparency, or other attribute of the geometric element varies within the geometric element, then the positions of the intersection points are used to determine the attribute values of the geometric element at the times and locations of its intersections with the selected sample ray. Second, the positions and depths of the intersection points of the space-time are used to resolve occlusion and visibility when two or more space-time projections intersect the selected sample ray at the same time.

In an embodiment, the attribute values of a geometric element are defined by surface attribute functions. Attributes of geometric elements can include optical properties of a surface, such as color, transparency, reflectivity, and refractivity. Attributes can also include visibility or occlusion information; artistically or procedurally generated texture data in one, two, three, or more dimensions; noise functions in one, two, three, or more dimensions, which can be used to procedurally generate or modify other surface attributes; shadow generation information; forces or attributes used for physics, cloth, fluid, or other types of simulations; animation data, which can be used to specify motion of entities associated with a surface point, such as fur or hair; modeling parameters, such as the density of procedurally generated grass applied to a model of a landscape; illumination information, which specifies the amount and direction of light on the surface point from other portions of the scene; and rendering information, such as ray tracing path information or radiosity rendering information. Functions can be relatively simple, such as looking up texture data from a texture map, or very complex, such as the evaluation of complex user-defined shader programs, ray tracing programs, animation or modeling programs, or simulation programs.

Figure 3A:
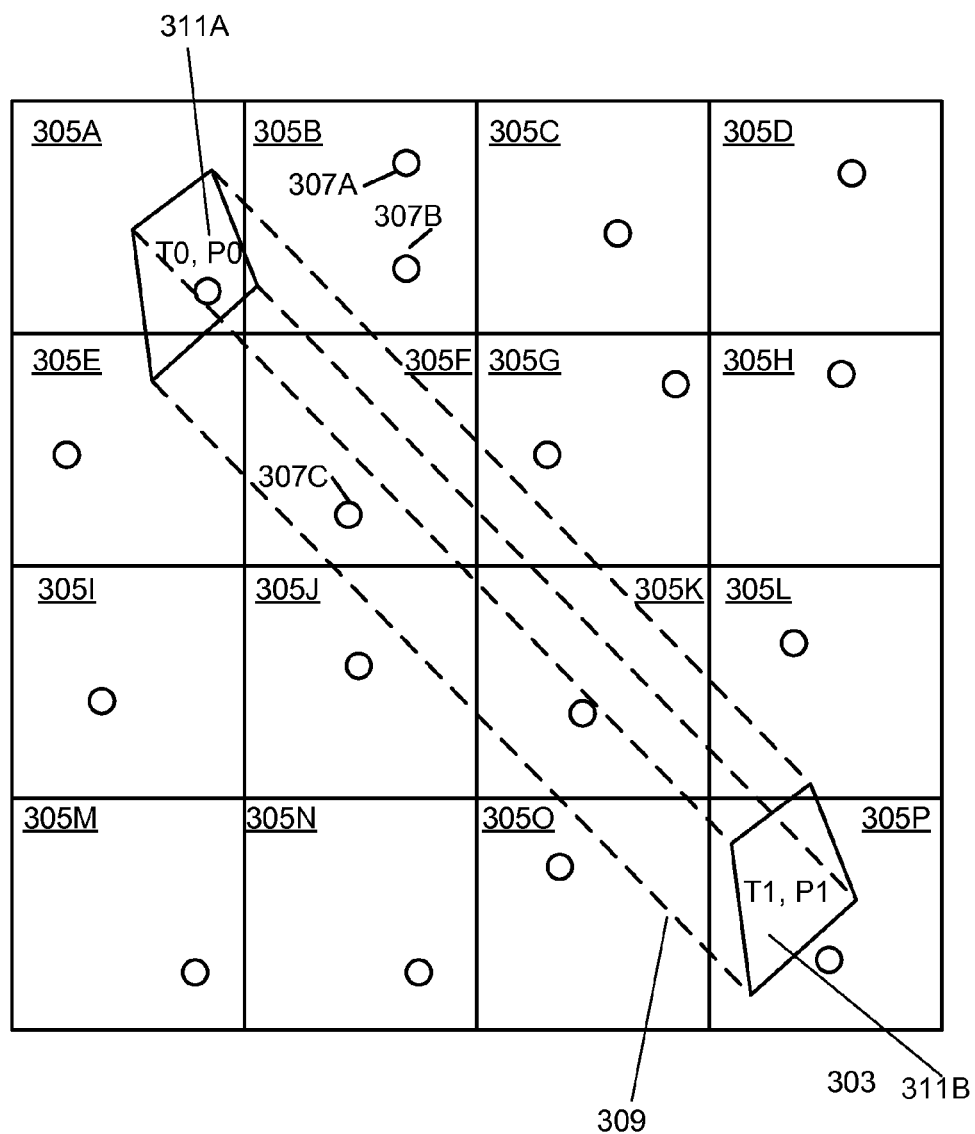
FIGS. 3A-3C illustrate the evaluation of example space-time projections of geometric elements according to an embodiment of the invention.
Figure 3B:
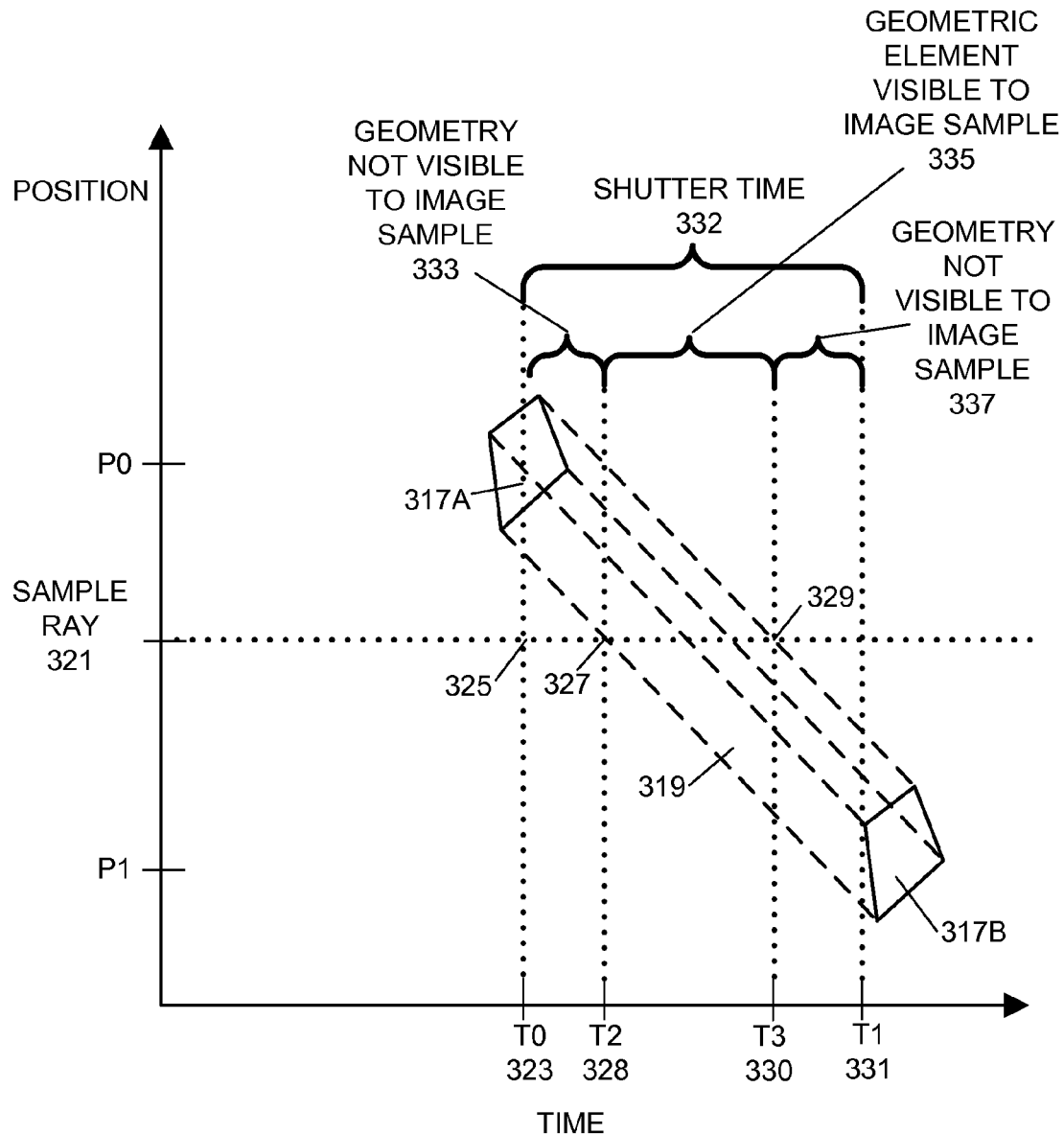
Figure 3C:
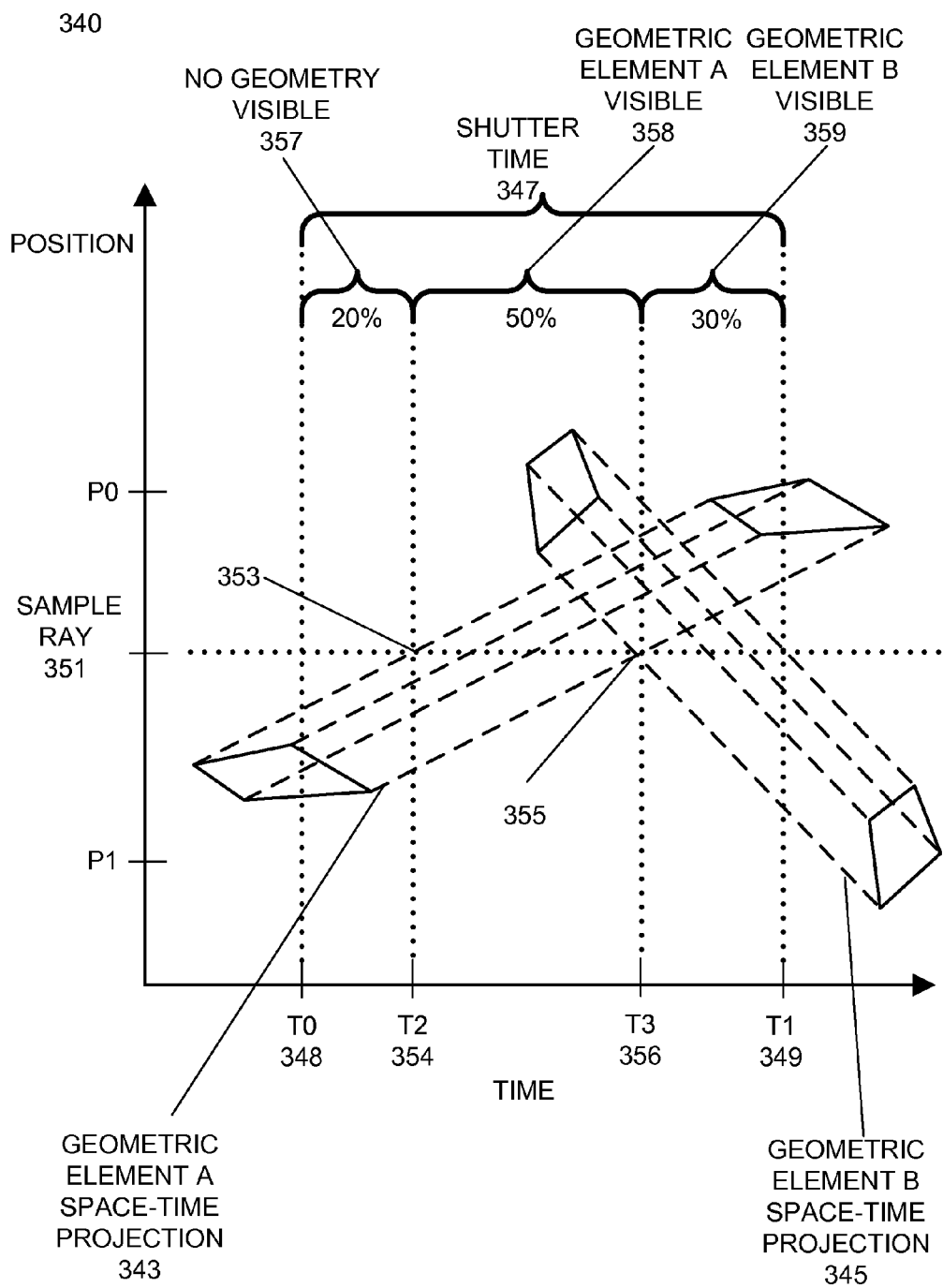

FIGS. 3A-3C illustrate the evaluation of example space-time projections of geometric elements according to an embodiment of the invention. FIGS. 3A-3C illustrate an example application of steps 115 to 130. FIG. 3A illustrates a view 300 of a space-time projection of a geometric element from a virtual camera viewpoint. An image plane 303 is defined to include a number of pixel regions 305, such as pixel regions 305A-305P. Each pixel region includes at least one image sample point 307, such as image sample points 307A and 307B in pixel region 305B and image sample point 307C in pixel region 305F.

View 300 also shows a space-time projection 309 of a geometric element. In this example, space-time projection 309 is defined by a geometric element located at position P0 at time T0, shown as 311A, and later located at position P1 at time T1, shown as 311B. As discussed above, an embodiment of the invention determines the attribute values of image sample points 307 by determining the intersection times and locations of the space-time projection 309 with the field of view of the image sample point. For example, it can be seen in FIG. 3A that image sample points 307A and 307B do not intersect the space-time projection 309. Therefore, geometric element 311 is not visible to these image sample points at any time during the shutter time between times T0 and T1. However, image sample point 307C does intersect the space-time projection 309, thus image sample point 307C does view geometric element 311 for a portion of the shutter time.

FIG. 3B illustrates an example evaluation 315 of a space-time projection intersecting an image sample point according to an embodiment of the invention. In FIG. 3B, the vertical axis designates position and the horizontal axis designates time. A geometric element 317A has a position P0 at the shutter opening time T0. This sample geometric element moves to position P1 at the shutter closing time T1 and is labeled 317B. For clarity, the motion of the geometric element 317 in three-dimensional space is shown in FIG. 3B as movement along the vertical axis; however, embodiments of the invention are intended to be applied to geometric elements that move, change orientation, and/or change shape in three-dimensional space over time. The movement of geometric element 317 defines the space-time projection 319. The space-time projection 319 of example geometric element 205 has a closed, six-sided shape.

Example 315 also includes the sample ray of a selected image sample 321. The exposure of the image sample from the geometric element 317 is determined from the intersection of this sample ray 321 with the space-time projection 319. In example 315, the shutter opens at time T0, 323. At this point in time, point 325 on sample ray 321 does not intersect any space-time projection. Therefore, the sample ray 321 does not view any geometric elements at the shutter opening time 323.

Advancing in time along the sample ray 321, sample ray 321 intersects the space-time projection 319 at point 327. Thus, the geometric element 317 first becomes visible to the image sample point at time T2, 328. Advancing further in time along the sample ray 321, the space-time projection 319 ends its intersection with the sample ray 321 at point 329. Thus, the geometric element 317 leaves the view of the image sample point at time T3, 330. Between time T3, 330, and the shutter close time T1, 331, there are no more intersections between the space-time projection 319 and the sample ray 321.

Thus, the shutter time period 332 between times T0, 323, and T1, 331, can be divided in this example into three time intervals: interval 333, from time T0, 323, to time T2, 328; interval 335, from time T2, 328, to time T3, 330; and interval 337, from time T3, 330, to time T1, 331. The geometric element 317 is visible to the image sample point during time interval 335. The geometric element 317 is not visible to the image sample point during time intervals 333 and 337. The attribute value, such as the color, of the image sample will be determined by weighting the attributes values viewed during each time interval. For example, if interval 335 is 50% of the shutter period and intervals 333 and 337 together are the other 50% of the shutter period, then the color value of the image sample point will be 50% of the color of the geometric element 317 and 50% of the background color (e.g. black). For example, if the geometric element 317 has a color value of 100% white (e.g. Red=1.0, Blue=1.0, Green=1.0), then the color value of the image sample in example 200 would be 50% white (e.g. Red=0.5, Blue=0.5, Green=0.5). This color value of the image sample takes into account that the white geometric element 317 is visible to the image sample point for only half of its shutter time 321.

An image sample point can view multiple geometric elements during its shutter time period. FIG. 3C illustrates an example evaluation 340 of multiple space-time projections intersecting an image sample point according to an embodiment of the invention. In FIG. 3C, the vertical axis designates position and the horizontal axis designates time. However, this representation is for clarity and embodiments of the invention are intended to be applied to geometric elements that move, change orientation, and/or change shape in three-dimensional space over time.

In example 340, a first geometric element, geometric element A, defines a first space-time projection 343. A second geometric element, geometric element B, defines a second space-time projection 345. An image sample point views the scene along sample ray 351. In this example, geometric element A is closer to the camera viewpoint than geometric element B at all times. A shutter time period 347 for an image sample point is defined between times T0, 348, and T1, 349.

Advancing in time along sample ray 351, the sample ray 351 first intersects space-time projection 343 at point 353. Thus, the image sample point first views geometric element A at the time T2, 354, associated with point 353. Continuing to advance in time along sample ray 351, at point 355, the sample ray 351 stops intersecting space-time projection 343 and starts to intersect space-time projection 345. Thus, at the time T3, 356, the image sample point stops viewing geometric element A and starts viewing geometric element B. In this example 340, the sample ray 351 continues to intersect the space-time projecting 345 of geometric element B from time T3, 356, until the end of the shutter time period 347, at time T1, 349.

Thus, the shutter time period 347 between times T0, 348, and T1, 349, can be divided in this example into three time intervals: interval 357, from time T0, 348, to time T2, 354; interval 358, from time T2, 354, to time T3, 356; and interval 359, from time T3, 356, to time T1, 349. In this example, no geometric elements are visible to the image sample point during interval 357, geometric element A is visible to the image sample point during interval 358, and geometric element B is visible to the image sample point during interval 359.

If interval 357 is 20% of the shutter time period 347, interval 358 is 50% of the shutter time period 347, and interval 359 is 30% of the shutter time period 347, then the attribute value, such as the color, of the image sample point will be the weighted combination of 20% of the background attribute value, 50% of the attribute value of geometric element A, and 30% of the attribute value of geometric element B. For example, if the background color is black (e.g. Red=0.0, Blue=0.0, Green=0.0), the color of geometric element A is blue (e.g. Red=0.0, Blue=1.0, Green=0.0), and the color of geometric element B is green (e.g. Red=0.0, Blue=0.0, Green=1.0), then the color value of the image sample will be 0.2* (0.0, 0.0, 0.0)+0.5*(0.0, 1.0, 0.0)+0.3* (0.0, 0.0, 1.0)=(Red=0.0, Blue=0.5, Green=0.3), which is a blue-green color value. This color value of the image sample takes into account that geometric element A is visible to the image sample point for 50% of its shutter time 321 and geometric element B is visible to the image sample point for 30% of its shutter time.

Although the examples of FIGS. 3B-3C illustrate the evaluation of space-time projections in world space, embodiments of the invention can also evaluate space-time projections of geometric elements in screen space, as shown in FIG. 3A.

As discussed above, step 120 of method 100 determines the intersection of space-time projections of geometric elements with the selected sample ray. Embodiments of the invention determine these intersections by evaluating the surfaces formed by the motion of edges of geometric elements during the shutter time, such as example surface 215 formed by the motion of edge 210 in FIG. 2. In these embodiments, when a surface associated with an edge of a geometric element intersects the selected sample ray, the intersection information, such as the identity of the associated geometric element, the intersection time, intersection position along the edge, and the intersection depth are stored in an edge list for the image sample point. Pairs of edges associated with the same geometric element indicate when the geometric element passes into and out of the view of the selected sample ray. In this embodiment, if an edge of a space-time projection of a geometric element intersects the selected sample ray prior to the shutter opening time or after the shutter closing time, an embodiment of the invention adds this edge to the edge list. This ensures that the edge list will always include an even number of edges for each geometric element.

An embodiment of step 120 determines the intersection of space-time projections of geometric elements with the selected sample ray using any ray or point intersection or enclosure test known in the art. In a further embodiment, the invention determines the intersections of a sample ray with a patch surface by creating an approximation surface from at least a portion of the surface's vertices. The approximation surface is comprised of polygons such as triangles. An intersection test between the sample ray and each of the polygons of the approximation surface is performed to detect any intersections.

In some cases, two or more space-time projections of geometric elements may intersect the selected sample ray during the same time interval. In this case, an embodiment of the invention determines which geometric element are closest to the camera viewpoint during this time interval. An embodiment of the invention evaluates the geometric elements in depth order to determine the selected sample ray value, taking into account effects such as occlusion and transparency. In some cases, one geometric element may be closer to the camera viewpoint for the entire time interval. In other cases, one geometric element may be closer to the camera viewpoint for a first portion of this time interval, while one or more additional geometric elements may be closer for other portions of this time interval. These cases can occur when the motion paths of geometric elements intersect in space. When multiple geometric elements intersect the selected sample ray during the same time interval, an embodiment of the invention can subdivide time intervals based on the depth values of geometric elements to identify the geometric element closest to the camera viewpoint at any point within the time interval.

Figure 4A:
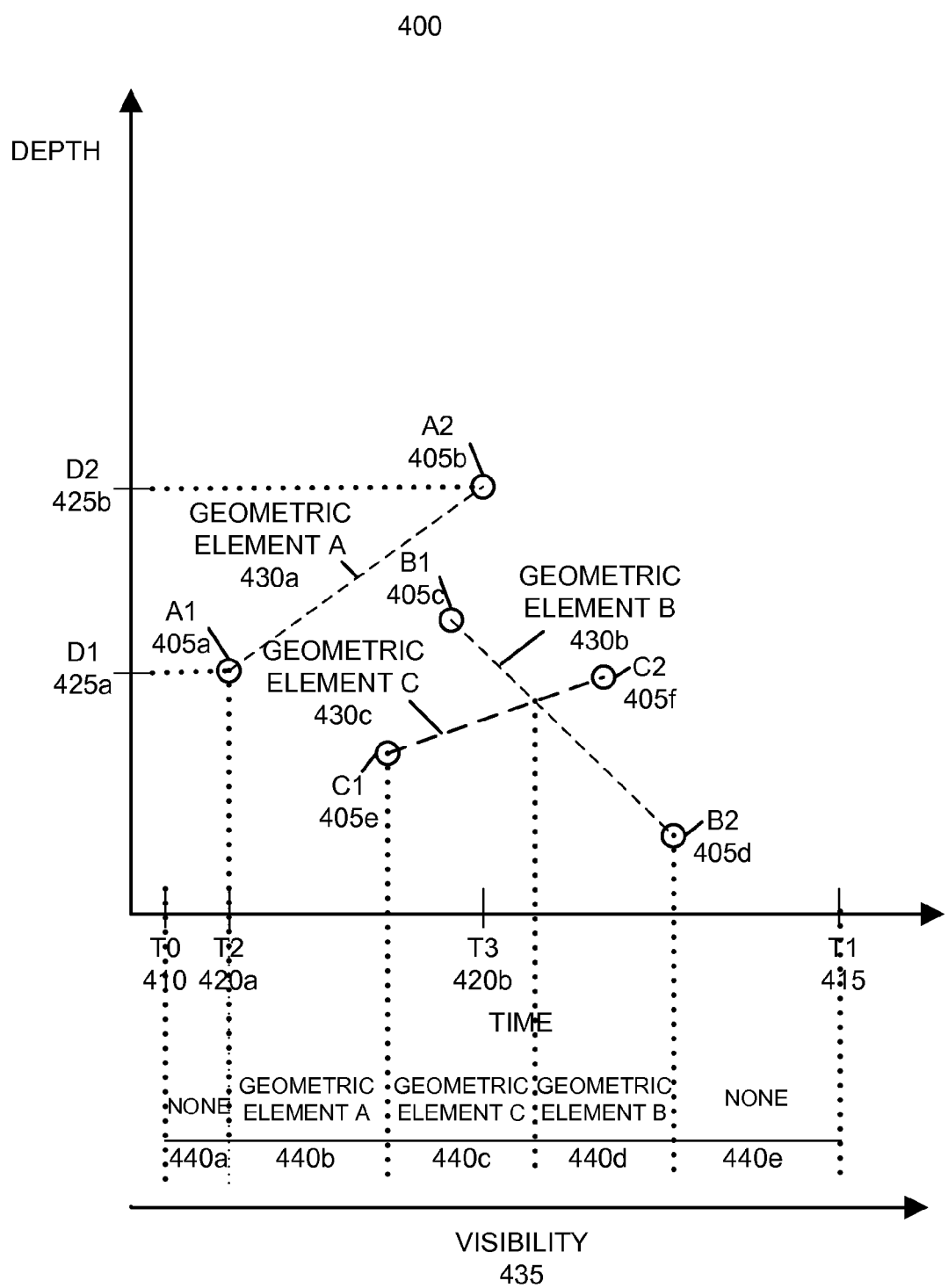
FIGS. 4A-4B illustrate examples of determining intersections of space-time projections of geometric elements with image samples according to an embodiment of the invention.
Figure 4B:
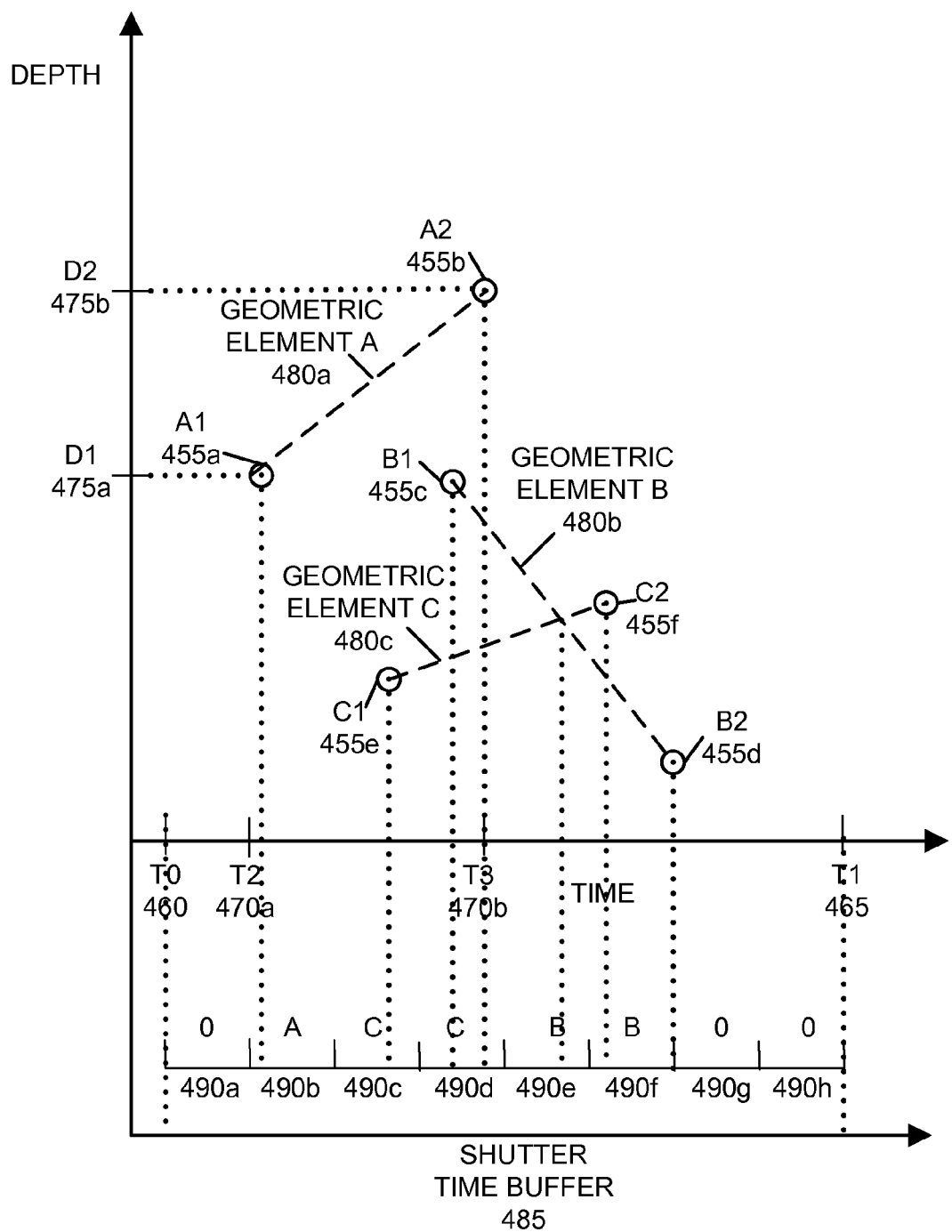

FIGS. 4A and 4B illustrate example techniques for evaluating multiple geometric elements intersecting the selected sample ray during the same time interval. FIG. 4A illustrates an example 400 of an analytic technique for resolving the visibility of multiple geometric elements intersecting the sample ray. Example 400 illustrates a set of edges 405 associated with the space-time projections of geometric elements, including edges A1 405*a* and A2 405*b* associated with a first geometric element A, edges B1 405*c* and B2 405*d* associated with a second geometric element B, and edges C1 405*e* and C2 405*f* associated with a third geometric element C, Each of the set of edges 405 intersect the sample ray at some point in time during the shutter time period between a shutter opening time T0 410 and a shutter closing time T1 415.

Example 400 illustrates the depths of geometric elements along an example sample ray as a function of time during the shutter time period. For example, edge A1 405*a* of the space-time projection of geometric element A intersects the sample ray at a time T2 420*a* and a depth D1 425*a*. Edge A2 405*b* of the space-time projection of geometric element A intersects the sample ray at a time T3 420*b* and a depth D2 425*b*. Thus, the space-time projection of geometric element A intersects the sample ray between times T2 420*a* and T3 420*b* and travels between depths D1 425*a* and D2 425*b*, as shown by line 430*a*.

Similarly, the intersection of the space-time projection of geometric element B with the sample ray is shown as line 430*b* and the intersection of the space-time projection of geometric element C with the sample ray is shown as line 430*c*.

To determine which geometric element is visible to the selected sample ray at any given time during the shutter time period, an embodiment of the invention determines which of the lines 430 are closest to the camera viewpoint during every point in the shutter time period. In this example 400, the depth increases with the distance from the camera viewpoint; thus, the line 430 with the lowest depth value at any given point is closest to the camera viewpoint and thus visible to the selected sample ray.

This embodiment of the invention may use projection and geometric clipping operations to define the visibility of the space-time projections of the geometric elements during the shutter time period. Example 400 includes a visibility function 435 specifying the visibility of geometric elements to the sample ray during the shutter time period. Example visibility function 435 is divided into intervals 440. During each of the intervals 440, the visibility function 435 is constant.

For example, during interval 440*b*, geometric element A is visible to the sample ray. During interval 440*c*, geometric element C is visible to the sample ray. In this example, the boundary between intervals 440*b* and 440*c* is defined by projecting lines 430*a* and 430*c* on to the image plane and clipping line 430*a*, the more distant line, against line 430*c*, the closer line.

Similarly, during interval 440*d*, geometric element B is visible to the sample ray. The boundary between interval 440*c* and 440*d* is determined by the intersection of lines 430*b* and 430*c*. Additionally, during intervals 440*a* and 440*e*, no geometric elements intersect the sample ray.

As discussed above, the relative size of the intervals 440 within the visibility function 435 determines the weight or contribution of each geometric element to the final attribute value of the sample ray and its associated image sample point.

Example 400 assumes that each geometric element is opaque. In the event that one or more geometric elements are partially transparent, an embodiment of the invention may define intervals 440 of the visibility function 435 including two or more geometric elements, with each interval of the visibility function 435 including the same combination and sequence of geometric elements.

FIG. 4B illustrates an example 450 of a discrete technique for resolving the visibility of multiple geometric element intersecting the sample ray of an image sample point. Similar to example 400, example 450 illustrates a set of edges 455 associated with the space-time projections of geometric elements, including edges A1 455*a* and A2 455*b* associated with a first geometric element A, edges B1 455*c* and B2 455*d* associated with a second geometric element B, and edges C1 455*e* and C2 455*f* associated with a third geometric element C, Each of the set of edges 455 intersect the sample ray at some point in time during the shutter time period between a shutter opening time T0 460 and a shutter closing time T1 465.

Example 450 illustrates the depths of geometric elements as a function of time during the shutter time period. For example, the space-time projection of geometric element A intersects the sample ray between times T2 470*a* and T3 470*b* and travels between depths D1 475*a* and D2 475*b*, as shown by line 480*a*. Similarly, the intersection of the space-time projection of geometric element B with the sample ray is shown as line 480*b* and the intersection of the space-time projection of geometric element C with the sample ray is shown as line 480*c*.

To determine which geometric element is visible to the selected sample ray at any given time during the shutter time period, an embodiment of the invention partitions the shutter time period between times T0 460 and T1 465 into a plurality of intervals. Each interval may be the same length or may have a different length, for example if geometric elements visible within the shutter time period have a non-linear weighting.

A shutter time buffer 485 is defined to include shutter time buffer entries 490. Each of the shutter time buffer entries 490 corresponds with an interval of the shutter time period. Each shutter time buffer entry is adapted to store at least one geometric element attribute value and a corresponding depth value. The shutter time buffer entries 490 are initialized with a null or background attribute value and a maximum depth value.

For each of the lines 480 corresponding with a geometric element, an embodiment of the invention identifies one or more shutter time buffer entries that overlap the line in time. For example, line 480*a*, corresponding with geometric element A, overlaps shutter time buffer entries 490*a*, 490*b*, 490*c*, and 490*d* in time. Similarly, line 480*b*, corresponding with geometric element B, overlaps shutter time buffer entries 490*d*, 490*e*, and 490*f* in time, and line 480*c*, corresponding with geometric element C, overlaps shutter time buffer entries 490*c*, 490*d*, 490*e*, and 490*f* in time.

For each of the shutter time buffer entries 490 that overlap a given geometric element in time, an embodiment of the invention compares the depth value of the shutter time buffer entry with the depth value of the geometric element during the corresponding time interval. If the geometric element's depth during a time interval is not constant, an embodiment may use an average depth of the geometric element during the time interval. In another embodiment, the depth of a geometric element at a random or pseudo-random time within the time interval may be used for comparison with the depth value of the shutter time buffer entry.

If the geometric element's depth during a time interval is closer to the camera viewpoint, as measured along the primary sample ray and any associated secondary sample rays, than the depth value of the corresponding shutter time buffer entry, an embodiment of the invention replaces the attribute value or values and depth value of the shutter time buffer entry with the attribute and depth values of the geometric element. Conversely, if the geometric element's depth during a time interval is further from the camera viewpoint than the depth value of the corresponding shutter time buffer entry, an embodiment of the invention leaves the shutter time buffer entry unmodified.

This comparison is repeated for each shutter time buffer entry overlapping a given geometric element in time and for all of the geometric elements intersecting the sample ray. After processing all of the overlapping shutter time buffer entries for all of the intersecting geometric elements, each of the shutter time buffer entries 490 stores the attribute values of the geometric element intersecting the sample ray of the image sample point and closest to the camera viewpoint during the associated time interval of the shutter time period, if any.

For example, geometric element A, indicated by line 480a, is closest to the camera viewpoint during the time interval associated with shutter time buffer entry 490b. Thus, the attribute value of geometric element A is stored in shutter time buffer entry 490b. However, geometric element C, indicated by line 480c, is closest to the camera viewpoint, and in front of geometric element A, during the time interval associated with shutter time buffer entries 490c.

Once all of the geometric elements intersecting the sample ray have been processed and potentially had their attribute values stored in the shutter time buffer 485, an embodiment of the invention combines the attribute values stored by the shutter time buffer entries. In an embodiment, the attribute values of the shutter time buffer entries 490 are weighted according to the relative length of their associated intervals of the shutter time period and combined. In this embodiment, if the intervals of the shutter time period are of equal length, the attribute values of the shutter time buffer entries 490 may be averaged. The result of this combination of attribute values of the shutter time buffer entries 490 is the value of the sample ray due to the motion-blurred geometric elements.

In some situations, one or more geometric elements may partially overlap a shutter time buffer entry in time. An embodiment takes this situation into account by weighting the attribute value of the geometric element to be potentially stored in the shutter time buffer entry by the proportion of the geometric element's coverage of the time interval of the shutter time buffer entry. For example, if geometric element C, indicated by line 480c, covered 30% of the time interval associated with the shutter time buffer entry 490c, shutter time buffer entry 490c will store 30% of the attribute value of geometric element C.

In example 450, the shutter time buffer entries 490a, 490g, and 490h are set to zero, as no geometric element is visible during these time intervals. Shutter time buffer entry 490b is set to the attribute value of geometric element A. Shutter time buffer entries 490c and 490d are set to the attribute value of geometric element C (or a weighted version thereof). Shutter time buffer entries 490e and 490f are set to the attribute value of geometric element B. In this example, shutter time buffer entry 490e is set to the attribute value of geometric element B, rather than the attribute value of geometric element C, because the average depth of geometric element B within the time interval corresponding with shutter time buffer entry 490e is closer to the camera viewpoint associated with this sample ray. In this example, if the shutter time intervals are of equal length and weight, then attribute value of the image sample point will be the average of the attribute values of shutter time buffer entries 490a through 490h.

Example 450 assumes that each geometric element is opaque. In the event that one or more geometric elements are partially transparent, an embodiment of the invention may combine or alpha blend the current attribute value of a shutter time buffer entry with the attribute value of a geometric element to produce a transparency effect.

In an embodiment, the above-described techniques and examples may be applied recursively to analytically render motion blur or other effects in conjunction with reflection, refraction, illumination, shadowing, scattering, and other rendering effects. In this embodiment, a sample ray originating at a camera viewpoint and intersecting an element of the scene, such as a geometric element, recursively generates one or more secondary sample rays, each of which is evaluated in a similar manner. As described in detail below, secondary sample rays may originate at the intersection in space and time between a primary sample ray and an element of the scene.

Figure 5A:
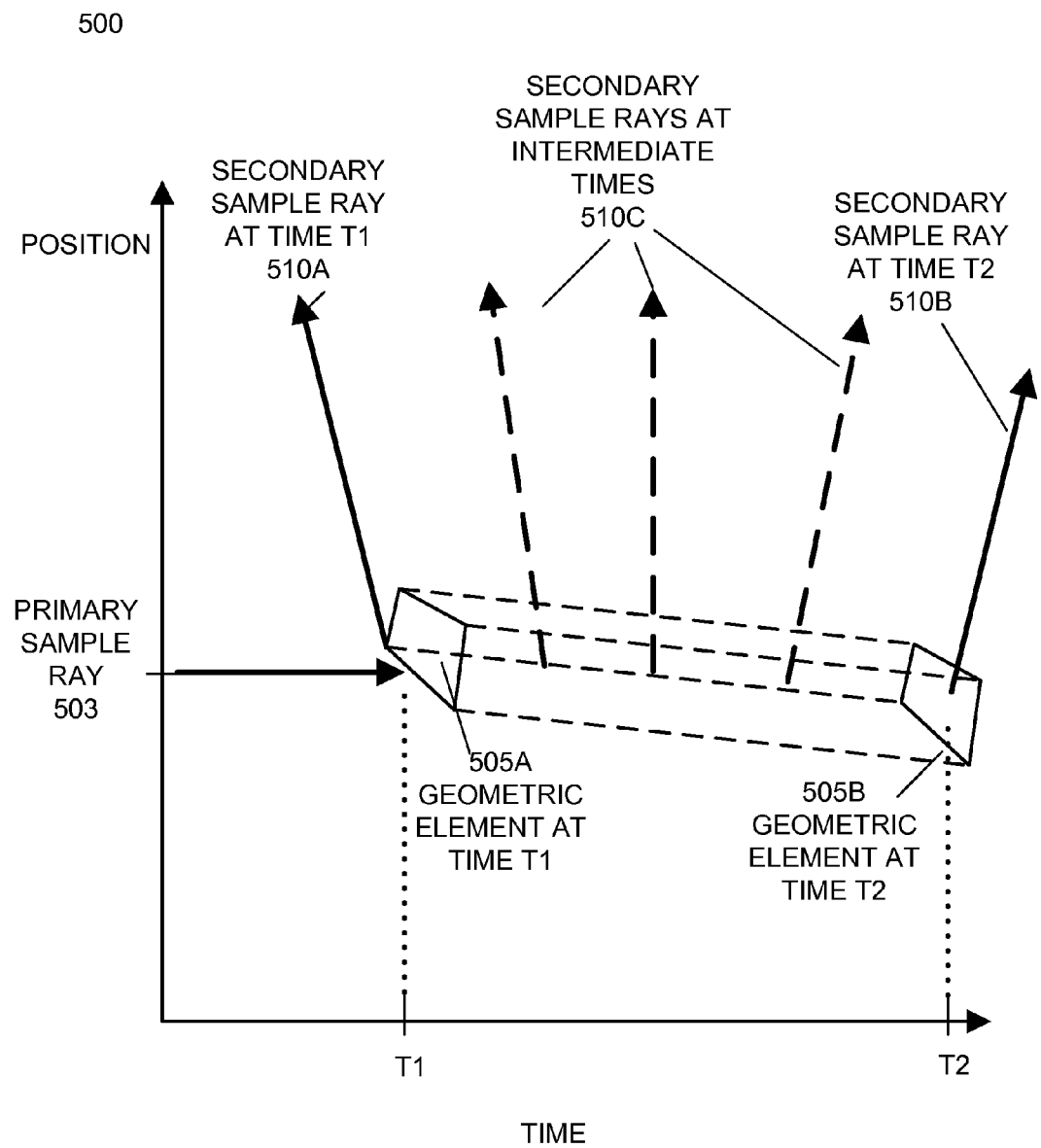
FIGS. 5A-5B illustrate examples of secondary sample rays created in response to intersections of space-time projections of geometric elements according to embodiments of the invention.

FIG. 5A illustrates an example 500 of recursive generation of secondary sample rays according to an embodiment of the invention. Example 500 illustrates the intersection of a sample ray 503 with a geometric element 505 over a time interval, such as a shutter exposure time. In this example 500, the sample ray 503 passes through an image plane used for rendering the scene and is oriented based on a virtual camera viewpoint; thus, sample ray 503 is referred to as a primary sample ray.

Primary sample ray 503 intersects geometric element 505 between times T1 and T2. At time T1, a secondary sample ray 510a is generated based on the intersection of primary sample ray 503 with geometric element 505a, which is the location of geometric element 505 at time T1. Secondary sample rays 510 may be created for any type of rendering effect. For example, secondary sample rays 510 can include reflection rays, refraction rays, scattering rays, illumination rays, and occlusion or shadowing rays.

Similarly, at time T2, a secondary sample ray 510b is generated based on the intersection of primary sample ray 503 with geometric element 505b, which is the location of geometric element 505 at time T2. Additional secondary sample rays 510c can be generated for the intersections of the primary sample ray 503 with the geometric element 505 at intermediate times between T1 and T2. In an embodiment, a regular, random, or pseudo-random distribution of additional secondary sample rays 510c are generated. In a further embodiment, the set of secondary sample rays 510 including secondary sample rays 510a, 510b, and 510c may be evaluated as a section of a continuous plane or surface, rather than discrete sample rays.

In an embodiment, secondary sample rays are evaluated in a similar manner as the primary sample ray. Intersections between secondary sample rays and space-time projections of geometric elements are determined. The duration of these intersections is used to weight or modulate the attribute values of the intersected geometric elements. The weighted attribute values determined for one or more secondary sample rays are then combined with the weighted attribute values, if any, of the associated primary sample ray to determine a total attribute value for the image sample associated with the primary sample ray. Each secondary sample ray may be associated with one or more weights used to determine its contribution to the attribute value of its parent sample ray, which may be the primary sample ray or a secondary sample ray.

Additional secondary sample rays may be generated recursively from the intersections of secondary sample rays with geometric elements or other entities in a scene. The number of secondary sample rays generated may optionally be limited by recursion depth or a threshold attribute value, such as accumulated transparency or opacity.

Figure 5B:
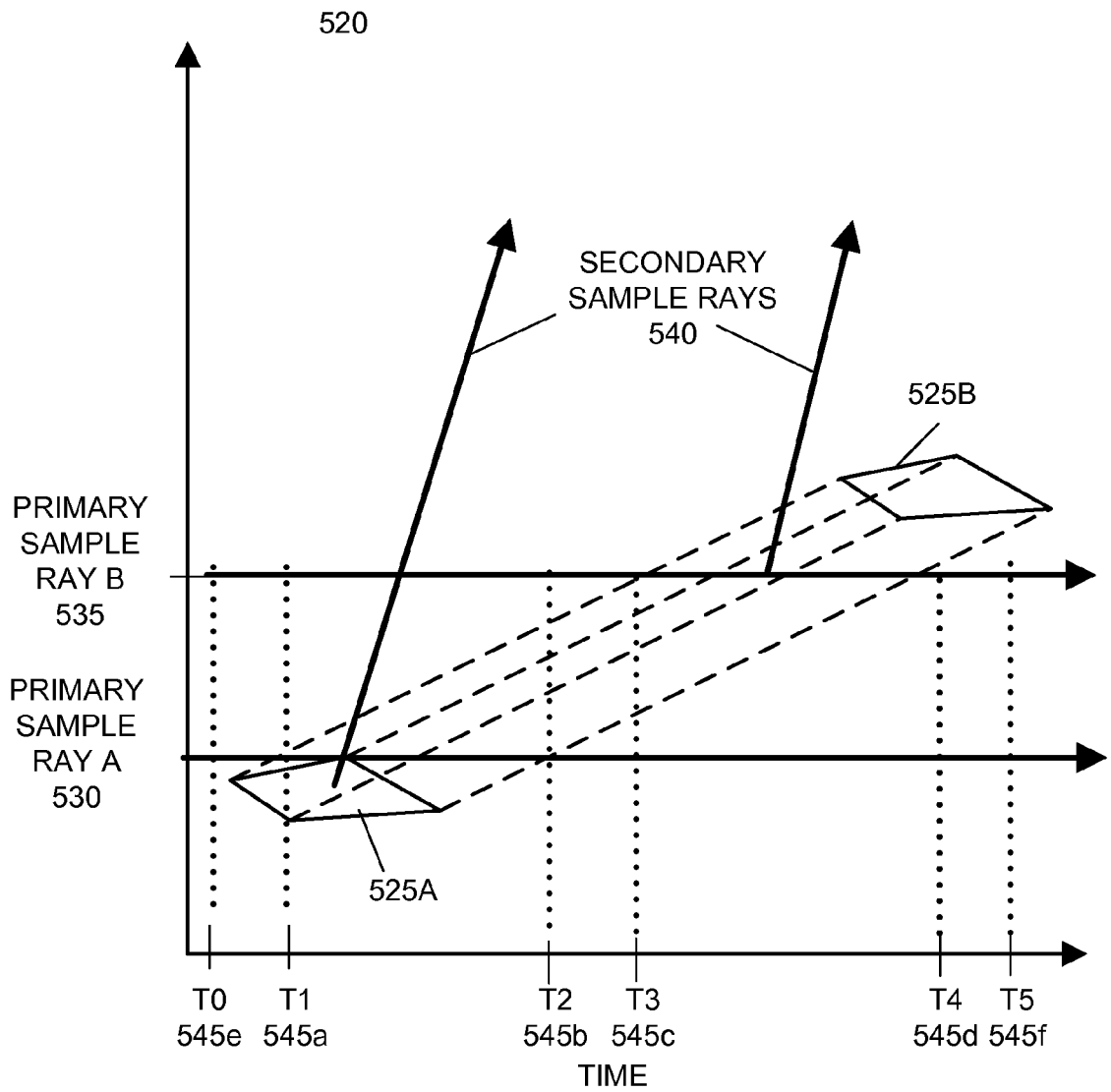

In further embodiments, the evaluation of secondary sample rays may be optimized based on the anticipated motion of a geometric element. FIG. 5B illustrates an example 520 of a geometric element 525 moving over a shutter or exposure time interval between times T0 545e and T5 545f. Geometric element 525 intersects primary sample ray A 530 time T1 545a, as shown by geometric element 525a. Geometric element 525 intersects primary sample ray A 530 from time T1 545e to time T2 545b. Similarly, geometric element 525 intersects primary sample ray B 535 between times T3 545c and 545d. In this example, the primary sample rays 530 and 535 are associated with different image samples.

As described above, one or more secondary sample rays 540 may be recursively generated based on the intersection of the geometric element 525 with the primary sample ray A 530. In an embodiment, a renderer may evaluate one or more of the secondary sample rays 540 associated with the time interval between times T1 545a and T2 545b to identify any intersections of the secondary sample rays 540 with elements in the scene during this time interval.

In a further embodiment, once at least one secondary sample ray 540 has been generated from the intersection of primary sample ray 530 with geometric element 525, a renderer may speculatively identify intersections of the secondary sample rays 540 with elements of the scene at any time during the shutter time interval, for example between times T0 545e and T5 545f. The attribute values associated with these secondary sample ray intersections are then applied to any other primary sample rays that also intersect the geometric element associated with these secondary sample rays.

For example, secondary sample rays 540 are initially generated in response to the intersection of primary sample ray A 530 with geometric element 525 at time T1 545a. An embodiment of a renderer determines any intersections of the secondary sample rays 540 with any scene elements during the entire shutter or exposure time interval, for example between times T0 545e and T5 545f. Additionally, the renderer in this example determines that primary sample ray B 535 intersects geometric element 525 between times T3 545c and T4 545d. Thus, the renderer applies the attribute values of secondary sample rays 540 between times T1 545a and T2 545b to primary sample ray A 530 and the attribute values of secondary sample rays 540 between times T3 545c and T4 545d to primary sample ray B 535.

FIG. 6 illustrates a computer system 2000 suitable for implementing an embodiment of the invention. Computer system 2000 typically includes a monitor 2100, computer 2200, a keyboard 2300, a user input device 2400, and a network interface 2500. User input device 2400 includes a computer mouse, a trackball, a track pad, graphics tablet, touch screen, and/or other wired or wireless input devices that allow a user to create or select graphics, objects, icons, and/or text appearing on the monitor 2100. Embodiments of network interface 2500 typically provides wired or wireless communication with an electronic communications network, such as a local area network, a wide area network, for example the Internet, and/or virtual networks, for example a virtual private network (VPN).

Computer 2200 typically includes components such as one or more processors 2600, and memory storage devices, such as a random access memory (RAM) 2700, disk drives 2800, and system bus 2900 interconnecting the above components. Processors 2600 can include one or more general purpose processors and optional special purpose processors for processing video data, audio data, or other types of data. RAM 2700 and disk drive 2800 are examples of tangible media for storage of data, audio/video files, computer programs, applet interpreters or compilers, virtual machines, and embodiments of the herein described invention. Other types of tangible media include floppy disks; removable hard disks; optical storage media such as DVD-ROM, CD-ROM, and bar codes; non-volatile memory devices such as flash memories; read-only-memories (ROMS); battery-backed volatile memories; and networked storage devices. A film recorder device can record images on photographic film for use with film projectors.

Further embodiments can be envisioned to one of ordinary skill in the art after reading the attached documents. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. Embodiments of the invention may be incorporated into any type of real-time, interactive, and/or non-real-time renderer, such as rasterization renderers, REYES-type renderers, ray-tracing renderers, and global illumination renderers. Embodiments of the invention and associated renderers may be implemented using software executed by general-purpose computing devices, specialized computer graphics hardware, such as graphics processing units, or any combination of hardware and software. It will, however, be evident that various modifications and changes may be made thereunto without departing from the broader spirit and scope of the invention as set forth in the claims.

What is claimed is:

1. A method of rendering an image including motion blur, the method comprising:

setting a shutter time period for an image;

determining at least one shutter opening time and at least one shutter closing time for the image;

selecting a geometric element from three-dimensional scene data, wherein the geometric element moves relative to a camera viewpoint between the shutter opening time and the shutter closing time;

determining a space-time projection of a geometric element, wherein the space-time projection geometrically represents three-dimensional space traversed by the geometric element relative to the camera viewpoint between the shutter opening time and the shutter closing time;

selecting an image sample in the image, wherein the image sample is associated with a sample ray;

determining a time interval within the shutter time period during which the sample ray intersects the space-time projection of the geometric element;

determining an attribute value of the selected attribute;

modifying the attribute value of the selected attribute of the geometric element based on the time interval; and determining a rendered image including the image sample, wherein the image sample includes an attribute value based at least in part on the modified attribute value of the geometric element;

wherein determining the space-time projection of the geometric element comprises:

determining a first position of a first edge at the shutter opening time;

determining a second position of the first edge at the shutter closing time; and defining a first surface bounded by the first edge at the first and second positions.

2. The method of claim 1, wherein modifying the attribute value of the selected attribute of the geometric element comprises:

determining a first intersection time of a first surface of the space-time projection of the geometric element with the sample ray of the selected image sample; and determining a second intersection time of a second surface of the space-time projection of the geometric element with the sample ray of the selected image sample.

3. The method of claim 2, wherein modifying the attribute value of the selected attribute of the geometric element comprises:

determining a difference between the first and second intersection times to define the time interval; and weighting the attribute value of the geometric element based on a proportion of the shutter time period corresponding with the time interval.

4. The method of claim 3, further comprising:

weighting the attribute of the geometric element based on a location of the time interval within the shutter time period.

5. The method of claim 2, further comprising:

determining a first intersection depth of the first surface of the space-time projection of the geometric element;

determining a second intersection depth of the second surface of the space-time projection of the geometric element;

comparing the first and second intersection depths with depths of first and second surfaces of a space-time projection of a second geometric element to determine the time interval between the first and second intersection times when the geometric element is closer to the camera viewpoint than the second geometric element.

6. The method of claim 5, further comprising:

analytically determining the time interval between the first and second intersection times when the geometric element is closer to the camera viewpoint than the second geometric element.

7. The method of claim 2, modifying the attribute value of the selected attribute of the geometric element comprises:

partitioning the shutter time period into a plurality of shutter time intervals;

defining shutter time buffer entries for the selected image sample, each shutter-time buffer entry adapted to store at least one attribute value and a depth value of a geometric element and associated with one of the plurality of shutter time intervals;

selecting a shutter time buffer entry associated with one of the plurality of shutter time intervals at least partially between the first and second intersection times;

determining a depth value of the geometric element at the associated time of the selected shutter time buffer entry;

comparing the depth value of the geometric element with a previously stored depth value of the selected shutter time buffer entry; and storing the attribute value and the depth value of the geometric element in the selected shutter time buffer entry in response to a determination that the depth value of the geometric element is closer to the camera viewpoint than the previously stored depth value of the selected shutter time buffer entry.

8. The method of claim 7, wherein determining the attribute value of the selected image sample comprises:

combining the attribute values of the shutter time buffer entries for the selected image sample.

9. The method of claim 2, wherein determining the first and second intersection times of the first and second surfaces of the space-time projection of the geometric element comprises:

defining a ray corresponding with the sample ray of the selected image sample; and determining the intersections of the ray with the first and second surfaces of the space-time projection of the geometric element.

10. The method of claim 2, wherein determining the first and second intersection times of the first and second surfaces of the space-time projection of the geometric element comprises:

projecting the first and second surfaces of the space-time projection of the geometric element on to a plane perpendicular to the sample ray of the selected image sample; and determining the intersections of the selected image sample with the first and second surfaces of the space-time projection of the geometric element.

11. The method of claim 1, wherein the attribute of the geometric element is selected from a group consisting of:

optical properties including color, transparency, reflectivity, or refractivity; visibility or occlusion information; artistically or procedurally generated texture data; noise functions; shadow generation information; forces or attributes used for simulations; animation data; modeling parameters; illumination information; and rendering information.

12. The method of claim 1, wherein the sample ray is selected from a group consisting of:

a primary sample ray associated with a camera viewpoint; a secondary sample ray associated with three-dimensional scene geometry and representing at least one of an illumination, a shadowing, a reflection, a refraction, a scattering, and an occlusion; a sample ray associated with at least one of a lens position and an aperture position; and a projection transformation to an image space coordinate reference frame.

13. A method of rendering an image including motion blur, the method comprising:

setting a shutter time period for an image;

determining at least one shutter opening time and at least one shutter closing time for the image;

selecting a geometric element from three-dimensional scene data, wherein the geometric element moves relative to a camera viewpoint between the shutter opening time and the shutter closing time;

determining a space-time projection of a geometric element, wherein the space-time projection geometrically represents three-dimensional space traversed by the geometric element relative to the camera viewpoint between the shutter opening time and the shutter closing time;

selecting an image sample in the image, wherein the image sample is associated with a sample ray;

determining a time interval within the shutter time period during which the sample ray intersects the space-time projection of the geometric element;

determining an attribute value of the selected attribute;

modifying the attribute value of the selected attribute of the geometric element based on the time interval; and determining a rendered image including the image sample, wherein the image sample includes an attribute value based at least in part on the modified attribute value of the geometric element;

wherein determining the space-time projection comprises:

determining a motion path defining the motion of the geometric element between the shutter opening time and shutter closing time; and sweeping the geometric element along the motion path to determine the space-time projection of the geometric element.

14. A method of rendering a computer graphics image, the method comprising:

receiving three-dimensional scene data;

defining an image sample including least one analytic dimension of evaluation and at least one discrete dimension of evaluation;

defining sample ray associated with the image sample;

determining an intersection of the sample ray with a geometric element defined by the three-dimensional scene data;

selecting an attribute of the geometric sample;

determining a contribution of the selected attribute of the geometric element to a value of the image sample analytically for the analytic dimension of evaluation and discretely for the discrete dimension of evaluation; and determining a rendered image including the image sample, wherein the image sample includes an attribute value based at least in part on the contribution of the selected attribute of the geometric element;

wherein the analytic dimension of evaluation includes at least one spatial dimension;

wherein determining the contribution of the selected attribute to the value of the image sample analytically for the analytic dimension of evaluation comprises:

analytically determining a portion of the image sample in the spatial dimension affected by the geometric element.

15. The method of claim 14, wherein the spatial dimension is selected from a group consisting of:

an image plane position; a lens position; an aperture position; a light source position; and an occlusion position.

16. The method of claim 14, wherein the discrete dimension of evaluation includes a time dimension.

17. The method of claim 14, wherein the analytic dimension of evaluation includes a time dimension.

18. The method of claim 17, wherein the time dimension includes a shutter time period.

19. The method of claim 14, wherein the attribute of the geometric element is selected from a group consisting of:

optical properties including color, transparency, reflectivity, or refractivity; visibility or occlusion information; artistically or procedurally generated texture data; noise functions; shadow generation information; forces or attributes used for simulations; animation data; modeling parameters; illumination information; and rendering information.

20. A method of rendering a computer graphics image, the method comprising:

receiving three-dimensional scene data;

defining an image sample including least one anal is dimension of evaluation and at least one discrete dimension of evaluation;

defining sample ray associated with the image sample;

determining an intersection of the sample ray with a geometric element defined by the three-dimensional scene data;

selecting an attribute of the geometric sample;

determining a contribution of the selected attribute of the geometric element to a value of the image sample analytically for the analytic dimension of evaluation and discretely for the discrete dimension of evaluation; and determining a rendered image including the image sample, wherein the image sample includes an attribute value based at least in part on the contribution of the selected attribute of the geometric element;

wherein the discrete dimension of evaluation includes at least one spatial dimension;

wherein the spatial dimension is selected from a group consisting of:

an image plane position; a lens position; an aperture position; a light source position; and an occlusion position.

21. A method of rendering a computer graphics image, the method comprising:

receiving three-dimensional scene data;

defining an image sample including least one analytic dimension of evaluation and at least one discrete dimension of evaluation;

defining sample ray associated with the image sample;

determining an intersection of the sample ray with a geometric element defined by the three-dimensional scene data;

selecting an attribute of the geometric sample;

determining a contribution of the selected attribute of the geometric element to a value of the image sample analytically for the analytic dimension of evaluation and discretely for the discrete dimension of evaluation; and determining a rendered image including the image sample, wherein the image sample includes an attribute value based at least in part on the contribution of the selected attribute of the geometric element;

wherein the analytic dimension of evaluation includes a time dimension;

wherein determining the contribution of the selected attribute to the value of the image sample analytically for the analytic dimension of evaluation comprises:

analytically determining a time interval within the time dimension affected by the geometric element.

22. The method of claim 21, wherein analytically determining the time interval comprises:

determining a space-time projection of the geometric element, wherein the space-time projection geometrically represents three-dimensional space traversed by the geometric element relative to the camera viewpoint during a shutter time period;

determining a first intersection time of a first surface of the space-time projection of the geometric element with the sample ray of the image sample;

determining a second intersection time of a second surface of the space-time projection of the geometric element with the sample ray of the image sample; and determining the time interval from the first and second intersection times.

* * * * *

UNITED STATES PATENT AND TRADEMARK OFFICE
CERTIFICATE OF CORRECTION

| | | |
|---|---|---|
| PATENT NO. | : 8,217,949 B1 | Page 1 of 1 |
| APPLICATION NO. | : 12/417431 | |
| DATED | : July 10, 2012 | |
| INVENTOR(S) | : Loren Carpenter and Robert L. Cook | |

It is certified that error appears in the above-identified patent and that said Letters Patent is hereby corrected as shown below:

In the Claims Section:
        Claim 20, Column 21, Line 60:
    Please delete "anal is" and insert --analytic--

Signed and Sealed this
Twelfth Day of November, 2013

Teresa Stanek Rea
*Deputy Director of the United States Patent and Trademark Office*